(12) United States Patent
Elenes et al.

(10) Patent No.: US 8,781,421 B2
(45) Date of Patent: Jul. 15, 2014

(54) TIME-DOMAIN DIVERSITY COMBINING OF SIGNALS FOR BROADCAST RECEIVERS

(71) Applicant: Silicon Laboratories Inc., Austin, TX (US)

(72) Inventors: Javier Elenes, Austin, TX (US); Emmanuel Gautier, Betton (FR); David Le Goff, Tinteniac (FR); Dana Taipale, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 13/630,457

(22) Filed: Sep. 28, 2012

(65) Prior Publication Data

US 2014/0094130 A1 Apr. 3, 2014

(51) Int. Cl.
*H04B 1/04* (2006.01)
(52) U.S. Cl.
USPC ..... 455/132; 455/130; 455/178.1; 455/191.1; 455/131
(58) Field of Classification Search
CPC ............... H04B 7/02; H04B 1/16; H04L 1/02
USPC ............. 455/130, 77, 178.1, 191.1, 132, 306, 455/307, 131, 207
See application file for complete search history.

(56) References Cited

U.S. PATENT DOCUMENTS

| | | | |
|---|---|---|---|
| 7,421,046 B2 | 9/2008 | Wallace et al. | |
| 7,627,051 B2 | 12/2009 | Shen et al. | |
| 7,889,822 B2 * | 2/2011 | Li et al. | 375/347 |
| 8,064,528 B2 | 11/2011 | Giannakis et al. | |
| 8,155,610 B2 | 4/2012 | Elenes | |
| 2006/0056281 A1 | 3/2006 | Ngo et al. | |
| 2011/0103435 A1 | 5/2011 | Whikehart | |
| 2011/0158339 A1 | 6/2011 | Tuttle et al. | |
| 2011/0158357 A1 | 6/2011 | Djadi et al. | |

OTHER PUBLICATIONS

Elenes et al., "Providing Phase Diversity Combining of Digital Radio Broadcast Signals", U.S. Appl. No. 13/162,164, Filed Jun. 16, 2011, 32 pgs.

* cited by examiner

*Primary Examiner* — Tuan Pham
(74) *Attorney, Agent, or Firm* — Egan, Peterman & Enders LLP.

(57) ABSTRACT

Systems and methods are disclosed for time-domain diversity combining of radio frequency (RF) broadcast signals. Two channelized quadrature (I/Q) signals are generated by different tuner circuitry coupled to two different antennas, are converted to frequency-domain signals, and are used to generate frequency-domain diversity weighting signals. The frequency-domain diversity weighting signals are then converted to time-domain weights and applied to the channelized I/Q signals. The weighted and channelized I/Q signals are then combined in the time-domain to provide a time-domain diversity combined signal. The resulting combined signal can be further processed, as desired, such as by using a demodulator to generate demodulated output signals. Disclosed methods and systems can be applied to a variety of receiver systems configured to receive RF broadcast signals.

24 Claims, 9 Drawing Sheets

TIME-DOMAIN DIVERSITY COMBINING OF SIGNALS FOR BROADCAST RECEIVERS

TECHNICAL FIELD OF THE INVENTION

This invention relates to antenna diversity for broadcast receivers and, more particularly, to receiver systems that utilize diversity combining for the reception of digital or analog broadcast transmissions.

BACKGROUND

Broadcast signal transmissions are often subject to multi-path distortions, particularly where receiver systems are moving (e.g., automobile, cellular phone, etc.). Multiple receive antennas and diversity combining techniques have been used to reduce degradation in receiver performance due to these multi-path distortions. In contrast to receiver systems that use diversity combining techniques to address multi-path distortions, other receiver systems are designed to receive multi-signal diversity transmissions where two or more transmitters are used to generate multi-signal diversity transmissions.

With respect to broadcasts that utilize OFDM (orthogonal frequency division multiplex) transmissions, such as HD-Radio (High Definition Radio) broadcasts in the United States, DAB/DMB (Digital Audio Broadcast/Digital Multimedia Broadcast) and DVB (Digital Video Broadcasting) broadcasts in Europe, ISDB-T (Integrated Services Digital Broadcasting—Terrestrial) broadcasts in Japan, and DTMB (Digital Terrestrial Multimedia Broadcast) broadcasts in China, diversity techniques are also useful in improving reception of the broadcast signals. Diversity combining for OFDM transmissions typically utilize diversity combining in the frequency-domain for the OFDM signals. This frequency-domain diversity combining requires channel estimation, frequency adjustments, and timing synchronization in order to combine the received OFDM signals for diversity.

FIG. 1 (Prior Art) is a more detailed block diagram of an embodiment 100 for a digital broadcast receiver system that utilizes frequency-domain OFDM diversity combining circuitry 146. First receiver circuitry 142 includes radio frequency front-end (RFFE) circuitry 152 that down-converts a radio frequency (RF) signal received from the antenna 138 and provides a down-converted quadrature (I/Q) signal to the analog-to-digital converter (ADC) 154. The ADC 154 provides a digitized signal to channelize circuitry 156, which in turn provides a channelized I/Q signal to the digital mixer 158 within the frequency-domain diversity combining circuitry 146. Similarly, second receiver circuitry 144 includes RFFE circuitry 162 that down-converts an RF signal received from the antenna 140 and provides a down-converted quadrature (I/Q) signal to the analog-to-digital converter (ADC) 164. The ADC 164 provides a digitized signal to channelize circuitry 166, which in turn provides a channelized I/Q signal to digital mixer 168 within the frequency-domain diversity combiner 146.

The frequency-domain OFDM diversity combining circuitry 146 includes mixers 158 and 168, fast Fourier transform (FFT) circuitry 160 and 170, synchronization (SYNC) block 172, channel estimators 174 and 184, ratio blocks 176 and 186, mixers 178 and 188, and combiner 180. The frequency-domain OFDM diversity combining circuitry 146 provides a combined I/Q receive signal 148 as an output. For the embodiment depicted, the combined I/Q receive signal 148 is then provided to de-mapper circuitry 190, deinterleave circuitry 192, and FEC (forward error correction) decode circuitry 194 before being provided as decoded output signals 196. These decoded output signals 196 can then be further processed by additional circuitry.

In operation, synchronization (SYNC) block 172 receives output signals from the mixers 158/168, provides a first frequency adjustment signal (f1$_{SYNC}$) 157 back to the mixer 158, and a second frequency adjustment signal (f2$_{SYNC}$) back to mixer 168. The SYNC block 172 also generates a first timing synchronization signal (T1$_{SYNC}$) 161 that is applied to the FFT circuitry 160. FFT circuitry 160 also receives the output signal from mixer 158. The output from FFT circuitry 160 is provided to channel estimator 174, which in turn provides a signal to complex conjugation block (R1) 176 to generate a weighted mixing signal that is mixed with the output signal from FFT circuitry 160 by mixer 178. Similarly, the SYNC block 172 generates a second timing synchronization signal (T2$_{SYNC}$) 171 that is applied to the FFT circuitry 170. The FFT circuitry 170 also receives the output signal from mixer 168. The output from FFT circuitry 170 is provided to channel estimator 184, which in turn provides a signal to second complex conjugation block (R2) 186 to generate a weighted mixing signal that is mixed with the output signal from FFT circuitry 170 by mixer 188. It is noted that conjugating the channel response using blocks (R1/R2) 176/186 phase aligns the two antenna signals so that they can be added coherently and weights each of these signals so that each contributes to the sum in proportion to its signal-to-noise ratio (SNR). The output if mixers 178/188 are provided to combiner 180, and combiner 180 generates a combined frequency-domain I/Q receive signal 148. It is noted that the frequency adjustment and timing synchronization provided by the SYNC block 172 is needed so that frequency-domain diversity weighting adjustments can be made using mixers 178 and 188 and the weighted mixing signals from the ratio blocks (R1, R2) 176 and 186.

One disadvantage with frequency-domain diversity combining, such as shown with respect to FIG. 1 (Prior Art), is the complexity and size required for the frequency-domain OFDM diversity combining circuitry 146, which requires channel estimation, related frequency adjustments, and timing synchronization in order to apply frequency-domain diversity combining to the received OFDM signals.

SUMMARY OF THE INVENTION

Systems and methods are disclosed for time-domain diversity combining of radio frequency (RF) broadcast signals. Two channelized quadrature (I/Q) signals are generated by different tuner circuitry coupled to two different antennas, are converted to frequency-domain signals, and are used to generate frequency-domain diversity weighting signals. The frequency-domain diversity weighting signals are then converted to time-domain weights and applied to the channelized I/Q signals. The weighted and channelized I/Q signals are then combined in the time-domain to provide a time-domain diversity combined signal. The resulting combined signal can be further processed, as desired, such as by using a demodulator (e.g., HD-Radio, DAB/DMB, DVB, FM, ISDB-T, DTMB, and other modulated RF broadcasts) to generate demodulated output signals. Disclosed methods and systems can be applied to a variety of receiver systems, for example, receiver systems configured to receive OFDM (orthogonal frequency division multiplex) signals from digital audio broadcast, Frequency Modulated (FM) signals from analog audio broadcast transmissions, and/or signals form other types of RF broadcast signals, such as DRM (Digital Radio Mondiale) signals from AM (Amplitude Modulation) analog audio broadcasts. Other features and variations could also be implemented, as desired, and related systems and methods can be utilized, as well.

In one embodiment, a diversity receiver system includes first tuner circuitry, second tuner circuitry, and time-domain diversity combining circuitry. The first tuner circuitry is configured to receive a radio frequency (RF) signal from a first antenna and to down-convert, digitize, and channelize the RF signal to generate a first time-domain channelized quadrature (I/Q) signal. The second tuner circuitry is configured to receive a radio frequency (RF) signal from a second antenna and to down-convert, digitize, and channelize the RF signal to generate a second time-domain channelized quadrature (I/Q) signal. The time-domain diversity combining circuitry is configured to receive the first and second channelized I/Q signals, to convert the first and second channelized I/Q signals to frequency-domain signals, to analyze the frequency-domain signals to determine frequency-domain diversity weights for the first and second channelized I/Q signals, to convert the frequency-domain diversity weights into at least one set of time-domain diversity weights, and to apply the time-domain diversity weights to generate a combined time-domain diversity I/Q signal based upon the first and second time-domain channelized I/Q signals. In a further embodiment, the first and second tuner circuitry are configured to receive OFDM (orthogonal frequency division multiplex) audio broadcast signals.

In another embodiment, the first tuner circuitry is integrated within a first integrated circuit, and the second tuner circuitry is integrated within a second integrated circuit. Still further, the time-domain diversity combining circuitry can be integrated within a third integrated circuit, and the third integrated circuit can be combined in a multi-chip module with at least one of the first integrated circuit or the second integrated circuit. In still a further embodiment, the time-domain diversity combining circuitry can be integrated within the second integrated circuit. Still further, the system can include a demodulator configured to receive the combined time-domain diversity I/Q signal and to output a demodulated audio signal. Further, the demodulator can be configured to demodulate at least one of HD-Radio (High Definition Radio) broadcast signals or DAB (Digital Audio Broadcast) broadcast signals. In another embodiment, the system further includes an FM (Frequency Modulated) demodulator integrated within the second integrated circuit and configured to receive the combined time-domain diversity I/Q signal, to demodulate FM broadcast signals, and to generate an FM demodulated audio signal. Still further, the system can include blend circuitry configured to receive the FM demodulated audio signal and the demodulated audio signal and to generate a blended audio signal. In another embodiment, the system further includes audio processing circuitry configured to receive the demodulated audio signal and to generate audio output signals, and the audio processing circuitry is integrated within the first integrated circuit. Still further, the audio processing circuitry can be configured to provide HI-FI audio processing. In addition, the demodulator can be integrated within one of the first integrated circuit or the second integrated circuit, and the demodulator can be configured to demodulate at least one of HD-Radio (High Definition Radio) broadcast signals or DAB (Digital Audio Broadcast) broadcast signals.

In an additional embodiment, the time-domain diversity combining circuitry includes first FFT (Fast Fourier Transform) circuitry coupled to receive the first time-domain channelized I/Q signal and to output a first frequency-domain signal having multiple frequency components, second FFT circuitry coupled to receive the second time-domain channelized I/Q signal and to output a second frequency-domain signal having multiple frequency components, weight processing circuitry configured to receive the first and second frequency-domain signals and to generate the frequency-domain diversity weights, and IFFT (Inverse Fast Fourier Transform) circuitry coupled to receive the frequency-domain diversity weights and to generate the at least one set of time-domain diversity weights.

In a further embodiment, the weight processing circuitry is configured to generate a first set and a second set of frequency-domain diversity weights, and the IFFT circuitry includes first IFFT circuitry configured to receive the first set of frequency-domain diversity weights and to generate a first set of time-domain diversity weights and second IFFT circuitry configured to receive the second set of frequency-domain diversity weights and to generate a second set of time-domain diversity weights. Still further, the time-domain diversity combining circuitry can further include a first filter configured to apply a first filter response to the first channelized I/Q signal based upon the first set of time-domain diversity weights, a second filter configured to apply a second filter response to the second channelized I/Q signal based upon the second set of time-domain diversity weights, and combiner circuitry configured to combined the filtered first and second channelized I/Q signals from the first and second filters to generate the combined time-domain diversity I/Q signal. In addition, the first and second IFFT circuitry can each be configured to generate a number (Y) of time-domain diversity weights that is less than a number (N) of points used by the first and second FFT circuitry to generate the frequency-domain signals having multiple frequency components.

In another embodiment, the weight processing circuitry is configured to generate a set of frequency-domain diversity weights, and wherein the IFFT circuitry is configured to receive the set of frequency-domain diversity weights and to generate a set of time-domain diversity weights. Still further, the time-domain diversity combining circuitry can further include a filter configured to apply a filter response to the second channelized I/Q signal based upon the set of time-domain diversity weights, delay circuitry coupled to the first channelized I/Q signal, and combiner circuitry configured to combined the filtered second channelized I/Q signal from the filter with the first channelized I/Q signal to generate the combined time-domain diversity I/Q signal. Still further, the IFFT circuitry can configured to generate a number (Y) of time-domain diversity weights that is less than a number (N) of points used by the first and second FFT circuitry to generate the frequency-domain signals having multiple frequency components.

In one other embodiment, a method for operating a diversity receiver system includes generating a first time-domain channelized quadrature (I/Q) signal from a radio frequency (RF) signal received from a first antenna, generating a second time-domain channelized quadrature (I/Q) signal from a radio frequency (RF) signal received from a first antenna, converting the first and second time-domain channelized I/Q signals to frequency-domain signals, determining frequency-domain diversity weights for the first and second channelized I/Q signals, converting the frequency-domain diversity weights into at least one set of time-domain diversity weights, and applying the time-domain diversity weights to generate a combined time-domain diversity I/Q signal based upon the first and second time-domain channelized I/Q signals. In a further embodiment, the received RF signals are OFDM (orthogonal frequency division multiplex) audio broadcast signals.

In a further embodiment, the method includes utilizing FFT (Fast Fourier Transform) circuitry to convert the first and second time-domain channelized I/Q signals to frequency-domain signals, and utilizing IFFT (Inverse Fast Fourier Transform) circuitry to convert the frequency-domain diversity weights to the at least one set of time-domain diversity weights. Still further, a number (Y) of time-domain diversity weights output by the IFFT circuitry can be less than a number (N) of points used by the FFT circuitry to generate the frequency-domain signals.

In a still further embodiment, the method can include generating a first set and a second set of frequency-domain diversity weights with the FFT circuitry, generating a first set and a second set of time-domain diversity weights with the IFFT circuitry, filtering the first channelized I/Q signal by applying the first set of time-domain diversity weights to a first filter, filtering the second channelized I/Q signal by applying the second set of time-domain diversity weights to a second filter, and combining output signals from the first and second filters to generate the combined time-domain diversity I/Q signal.

In another embodiment, the method can include generating a set of frequency-domain diversity weights with the FFT circuitry, generating a set of time-domain diversity weights with the IFFT circuitry, filtering the second channelized I/Q signal by applying the set of time-domain diversity weights to a filter, delaying the first channelized I/Q signal to generate a delayed version of the first channelized I/Q signal, and combining an output signal from the filter and the delayed version of the first channelized I/Q signal to generate the combined time-domain diversity I/Q signal.

Other features and variations could also be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Systems and methods are disclosed for time-domain diversity combining of radio frequency (RF) broadcast signals. Two channelized quadrature (I/Q) signals are generated by different tuner circuitry coupled to two different antennas, are converted to frequency-domain signals, and are used to generate frequency-domain diversity weighting signals. The frequency-domain diversity weighting signals are then converted to time-domain weights and applied to the channelized I/Q signals. The weighted and channelized I/Q signals are then combined in the time-domain to provide a time-domain diversity combined signal. The resulting combined signal can be further processed, as desired, such as by using a demodulator (e.g., HD-Radio, DAB/DMB, DVB, FM, ISDB-T, DTMB, and other modulated RF broadcasts) to generate demodulated output signals. Disclosed methods and systems can be applied to a variety of receiver systems, for example, receiver systems configured to receive OFDM (orthogonal frequency division multiplex) signals from digital audio broadcast, Frequency Modulated (FM) signals from analog audio broadcast transmissions, and/or signals form other types of RF broadcast signals, such as DRM (Digital Radio Mondiale) signals from AM (Amplitude Modulation) analog audio broadcasts. Other features and variations could also be implemented, as desired, and related systems and methods can be utilized, as well.

Figure 2:
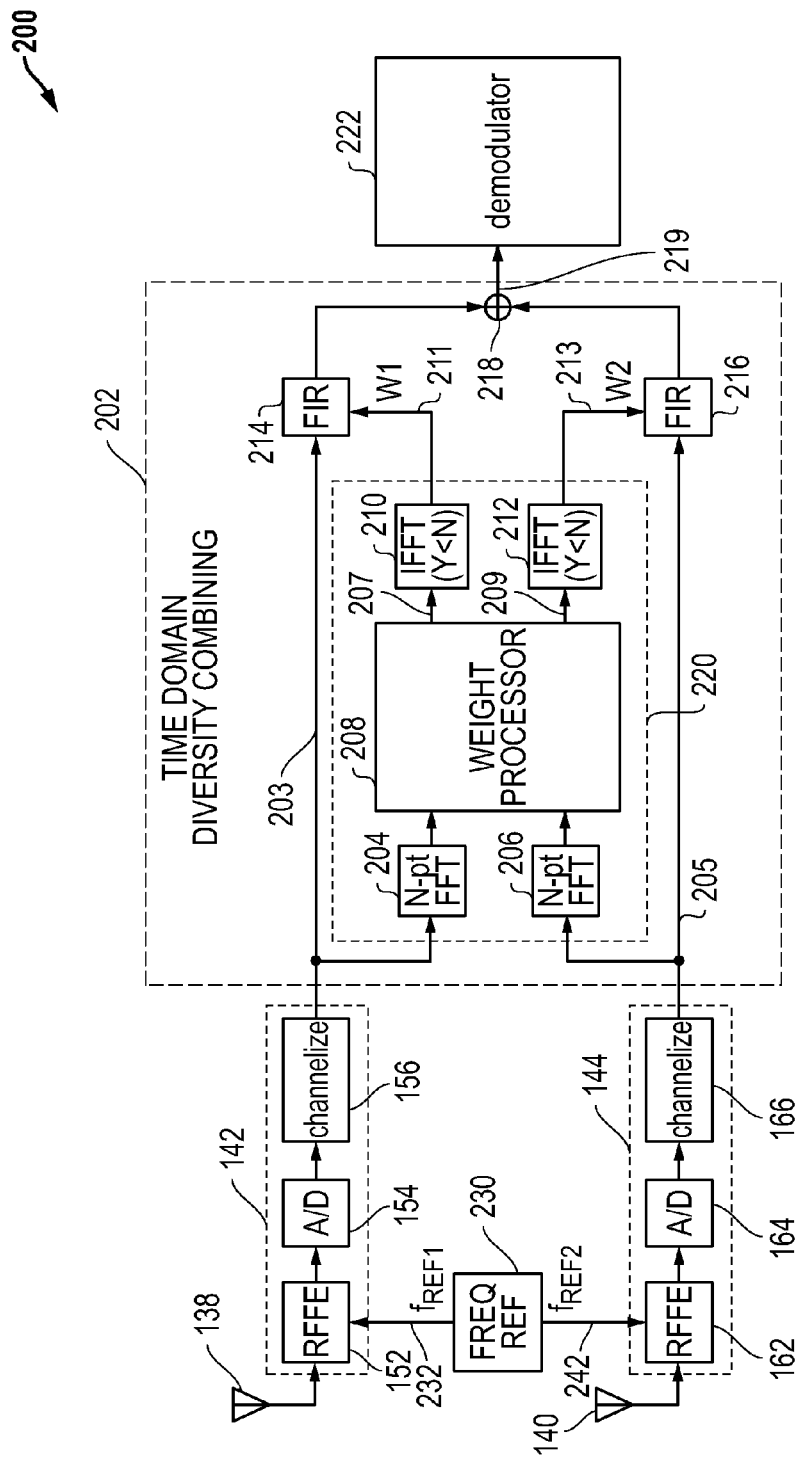
FIG. 2 is a block diagram of an embodiment for a digital broadcast receiver system that utilizes time-domain diversity combining and multi-antenna weighting.
Figure 3:
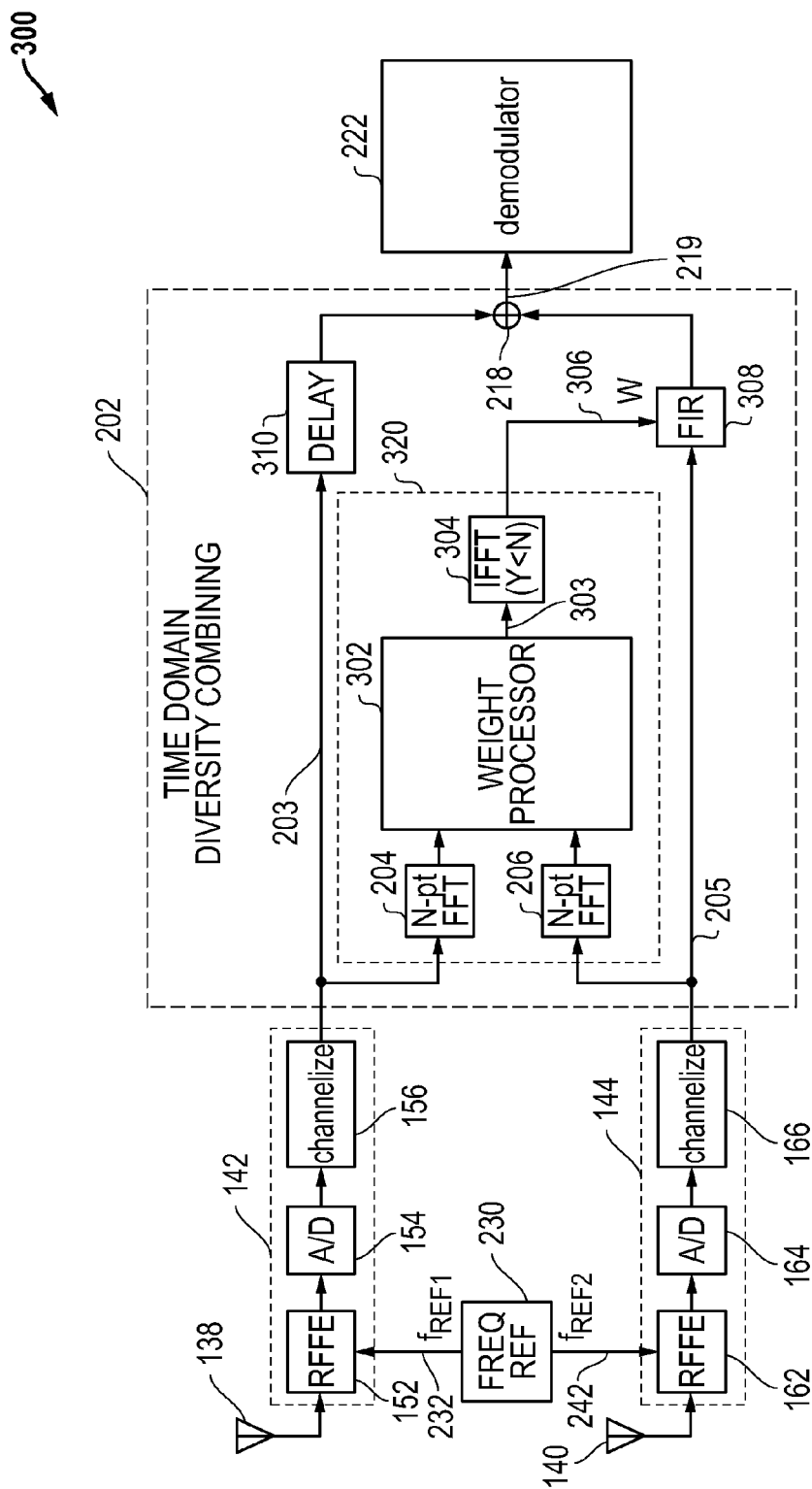
FIG. 3 is a block diagram of an embodiment for a digital broadcast receiver system that utilizes time-domain diversity combining and single-antenna weighting.

The time-domain diversity combining provided by the embodiments described herein advantageously reduce the complexity and circuitry required to use diversity techniques to improve reception of digital broadcast signals, particularly where multi-path distortions occur. FIG. 2 provides an embodiment that applies time-domain diversity weighting to two channelized I/Q signals from two different antennas before combining them to generate a combined I/Q receive signal. FIG. 3 provides an embodiment that applies time-domain diversity weighting to one of two channelized I/Q signals that are based upon RF signals received by two different antennas before combining them to generate a combined I/Q receive signal. FIGS. 4-10 provide integrated circuit embodiments that include time-domain diversity combining circuitry that provides combined I/Q receive signals. It is noted that the quadrature I/Q signals referred to herein represent an input signal that has been converted into real (I) and imaginary (Q) signals that are out of phase with respect to each other by about 90 degrees. It is also noted that, as used herein, a tuner receives RF (radio frequency) signals and generates I/Q signals, and a demodulator receives the I/Q signals or signals based upon the I/Q signals and generates demodulated data, audio, video, etc. signals. A receiver system, as used herein, refers to any device, circuitry, or other software/hardware functional blocks that receive a process RF signals, and a receiver system can include a tuner with or without a demodulator. It is further noted that additional antennas and/or additional signal processing paths could also be utilized as well, if desired, so that more than two signal paths are used for the time-domain diversity combining In addition, while audio broadcasts and audio output signals are primarily discussed with respect to the disclosed embodiments, the time-domain diversity combining embodiments described herein are not limited to audio broadcast information and can also be utilized with respect to RF broadcasts including data, video and/or other desired information in addition to and/or instead of audio signals, if desired.

Figure 1:
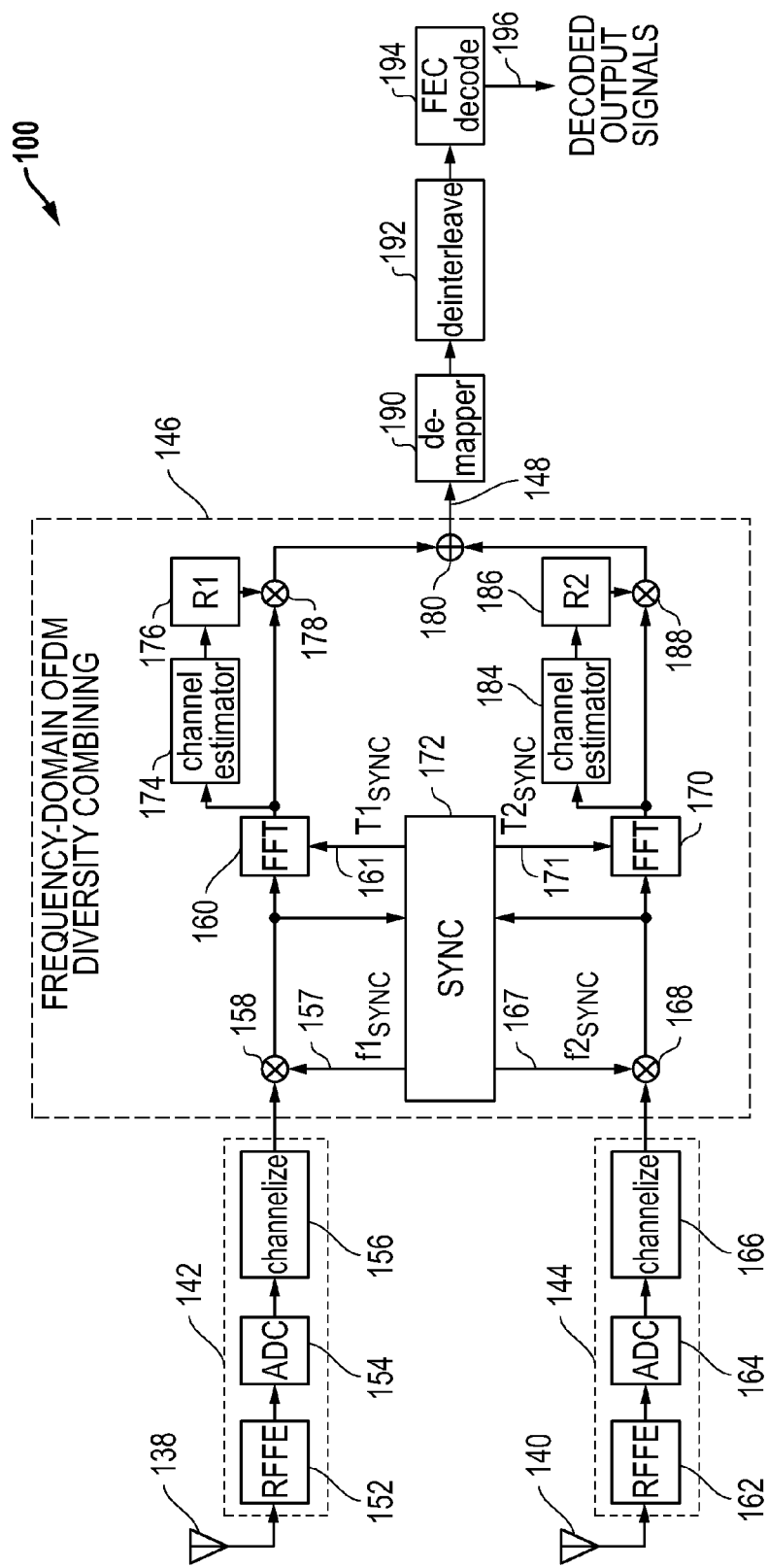
FIG. 1 (Prior Art) is a more detailed block diagram of an embodiment for a digital broadcast receiver system that utilizes frequency-domain OFDM (orthogonal frequency division multiplex) diversity combining.

Looking first to FIG. 2, a block diagram is provided of an embodiment 200 for a broadcast receiver system that utilizes time-domain diversity combining circuitry 202 to produce a diversity combined I/Q signal 219. As with embodiment 100 in FIG. 1 (Prior Art), a first tuner 142 includes radio frequency front-end (RFFE) circuitry 152 that down-converts a received signal from the antenna 138 and provides a down-converted quadrature (I/Q) signal to the analog-to-digital converter (ADC) 154. The ADC 154 provides a digitized signal to channelize circuitry 156, which in turn provides a first channelized I/Q output signal. A second tuner 144 includes RFFE circuitry 162 that down-converts a received signal from the antenna 140 and provides a down-converted I/Q signal to the analog-to-digital converter (ADC) 164. The ADC 164 provides a digitized signal to channelize circuitry 166, which in turn provides a second channelized I/Q output signal. In contrast with FIG. 1 (Prior Art), however, the first and second channelized I/Q output signals are provided to time-domain diversity combining circuitry 202. For embodiment 200, it is also noted that frequency reference (FREQ REF) circuitry 230 can be included to provide a first frequency reference signal ($f_{REF1}$) 232 to RFFE circuitry 152 and to provide a second frequency reference signal ($f_{REF2}$) 242 to RFFE circuitry 162 in order to synchronize the received signals for later combining without generating undesirable inter-carrier interference.

The time-domain diversity combining circuitry 202 includes a first filter 214, a second filter 216, and diversity weighting circuitry 220. The filters 214 and 216 can be, for example, FIR (finite impulse response) filters that provide filter responses that are dependent upon filter control parameters or coefficients. As depicted, the first filter 214 applies a filter response to the first channelized I/Q signal 203, and this filter response is dependent upon a first time-domain weighting signal (W1) 211. The second filter 216 applies a filter response to the second channelized I/Q signal 205, and this filter response is dependent upon a second time-domain weighting signal (W2) 213. The filtered I/Q output signals from filters 214 and 216 are then provided to combiner 218, which in turn provides a combined I/Q receive signal 219 to a standard demodulator 222. The demodulator 222 can be implemented, as desired, to demodulate the combined I/Q receive signal 219. For example, the demodulator 222 can demodulate HD-Radio (High Definition Radio) formats, DAB (Digital Audio Broadcast) formats, and/or any other desired broadcast modulation technique utilized for the broadcast signals. It is noted the HD-Radio formats are utilized for digital radio broadcasts in the United States, and DAB formats are utilized for digital radio broadcasts in Europe and other regions of the world.

The filter weights provided by the first and second weighting signals (W1, W2) 214 and 216 are generated by diversity weighting circuitry 220. For the embodiment depicted, the diversity weighting circuitry 220 includes FFT (Fast Fourier Transform) block 204, FFT block 206, weight processor 208, inverse FFT (IFFT) block 210, and IFFT block 212. In particular, the first channelized I/Q signal 203 is provided to FFT block 204, which performs an N-point (N-PT) FFT operation on the first channelized I/Q signal 203. The output from FFT block 204 is provided to the weight processor 208. Similarly, the second channelized I/Q signal 205 is provided to FFT block 206, which performs an N-point (N-PT) FFT operation on the second channelized I/Q signal 205. The output from FFT block 205 is also provided to the weight processor 208. It is noted that the FFT output signals from blocks 204 and 206 are frequency-domain signals that include multiple frequency components in N different frequency bins determined by the N-point FFT operations.

The weight processor 208 analyzes the FFT output signals from blocks 204 and 206 to determine signal parameters associated with the received signals from the two different antennas 138 and 140. For example, the signal parameters can include signal-to-noise ratio information, signal strength information, and phase information. The weight processor 208 then determines signal path weights based upon the analysis of the signal parameters and produces two path weight signals 207 and 209. These path weight signals 207 and 209 are frequency-domain signals. The first path weight signal 207 is provided to IFFT block 210, which converts the first path weight signal 207 from a frequency-domain signal to the first time-domain weighting signal (W1) 211. The second path weight signal 209 is provided to IFFT block 212, which converts the second path weight signal 209 from a frequency-domain signal to the second time-domain weighting signal (W2) 213. As described above, the first and second time-domain weighting signals (W1, W2) 211 and 213 are used to control the frequency response of filters 214 and 216. For example, where the filters 214 and 216 are FIR filters, the first and second time-domain weighting signals (W1, W2) 211 and 213 provide frequency control parameters or coefficients for the FIR taps that control the time-varying frequency response applied by the FIR filters. It is further noted that where filters 214 and 216 are FIR filters, the filters 214 and 216 operate to linearly convolve the time-domain channelized I/Q signals 203 and 205 with the weighted time-domain filter tap weights 211 and 213. It is also noted that time-domain filtering can also be performed, if desired, on the weighting signals 211 and 213 to reduce the noise inherent in weight estimation process.

It is noted that the IFFT blocks 210 and 212 can be configured to provide a reduced number of filter weighting parameters or coefficients (Y) as compared to the number of frequency points (N) applied by the N-point FFT blocks 204 and 206, such that Y<N. Preferably, the number of weighting parameters or coefficients (Y) is much less than the number of frequency points (N). Further, it is noted that where FIR filters are used for filters 214 and 216, the value for the number of parameters or coefficients (Y) can be associated with a maximum delay spread for the FIR filters. For example, the number of points (N) can be on the order of 2048 points, and the number of weighting parameters or coefficients can be on the order of 38 filter weighting parameters or coefficients for the filters 214 or 216. It is further noted that different numbers of FFT points and IFFT output parameters or coefficients could also be implemented, as desired, while still utilizing the time-domain diversity combining techniques described herein.

It is also noted that the RFFEs 152/162 can be configured to down-convert broadcast channels within the RF signals to any desired frequency to generate the down-converted I/Q signals that are then provided to the ADC circuitry 154/164. The ADC circuitry 154/164 and channelizing circuitry 156/166 are configured based upon the down-conversion provided by the RFFE circuitry 152/162. For example, the RFFE circuitry 152/162 can be configured to down-convert a desired broadcast channel within the received RF signals to produce down-converted I/Q signals at a desired intermediate frequency (IF). Further, this IF can be configured to be relatively close to 0 Hz as compared to the channel width for the broadcast channels to be tuned. The RFFEs 152/162 can also be configured to down-convert a desired broadcast channel within the received RF signals directly to 0 Hz to produce down-converted I/Q signals at 0 Hz. This down-conversion to 0 Hz is often called a zero-IF down-conversion or a direct down-conversion. It is further noted that some digital broadcasts, such as HD-Radio broadcasts, include multiple digital sub-channels and related sub-channel frequencies centered around a primary broadcast channel and related channel frequency. For such a digital broadcast, the primary broadcast channel can be down-converted to the desired IF frequency, including zero-IF, and a desired sub-channel can be tuned and demodulated with down-stream receiver circuitry. Other variations could also be implemented, as desired.

It is further noted that a variety of techniques can be used by the weight processor 208 to determine frequency-domain weight signals. For example, a maximal ratio combining (MRC) technique could be used to generate frequency-domain weight signals that are complex conjugates of the channel response. Alternatively, the frequency-domain weight signals can be generated as complex conjugates of the raw FFT data from FFT blocks 204 and 206. The embodiment 200 in FIG. 2, for example, can utilize the MRC technique. Another technique that could be provided is an equal-gain combining (EGC) technique where the frequency-domain weight signals represent unity gain co-phasing vectors. Further, with the EGC technique, the number of filters can be reduced by one (e.g., for N antennas, the number of antennas can be reduced to N−1). Thus, while two filters 214 and 216 are used in FIG. 2 to apply filter responses to both the first and second channelized I/Q signals 203 and 205, a single filter could also be utilized, if desired. For example, as shown in the embodiment 300 of FIG. 3 and described in more detail below, a single filter 308 is used to apply a filter response to one signal path and then co-phase this signal with the other signal path. It is further noted that for the time-domain diversity combining embodiments described herein, there is no requirement to further synchronize to the signal in time and frequency. Furthermore, channel state information is preserved in the cyclic prefix associated with the combined I/Q signal or digital samples provided by the channelizing circuitry 156 and 166. Variations could be implemented as desired while still taking advantage of the time-domain diversity combining techniques described herein.

Looking now to FIG. 3, a block diagram is provided of an embodiment 300 for a digital broadcast receiver system that utilizes diversity weighting circuitry 320 to produce a single weighting signal (W) for a single filter 308. As indicated above, the filter 308 can be a FIR filter, if desired, that applies a time-varying filter response to a channelized signal 205 based upon tap filter parameters or coefficients based upon the time-domain weighting signal (W) 306. Similar to embodiment 200 in FIG. 2, first receiver circuitry 142 includes RFFE circuitry 152 that down-converts an RF signal received from antenna 138 and provides a down-converted I/Q signal to ADC 154. The ADC 154 provides a digitized signal to channelize circuitry 156, which in turn provides a first channelized I/Q output signal. Second receiver circuitry 144 includes RFFE circuitry 162 that down-converts an RF signal received from antenna 140 and provides a down-converted I/Q signal to ADC 164. The ADC 164 provides a digitized signal to channelize circuitry 166, which in turn provides a second channelized I/Q output signal. In addition, as indicated above, frequency reference (FREQ REF) circuitry 230 can be included to provide a first frequency reference signal ($f_{REF1}$) 232 to RFFE circuitry 152 and to provide a second frequency reference signal ($f_{REF2}$) 242 to RFFE circuitry 162 in order to synchronize the received signals for later combining without generating undesirable inter-carrier interference In contrast with FIG. 2, the time-domain diversity combining circuitry 202 for embodiment 300 includes a single filter 308, which can be an FIR filter, if desired. For the embodiment 300 depicted, the filter 308 applies a filter response to the second channelized signal 205, and this filter response is dependent upon a time-domain weighting signal (W) 306. It is further noted that a delay equal to the group delay of the filter 308 (e.g., FIR filter) is applied by delay block (DELAY) 310 to the first channelized I/Q signal 203. The filtered I/Q output signal from filter 308 and the delayed first channelized I/Q signal 203 are provided to combiner 218, which in turn provides a combined receive signal 219 to demodulator 222.

The filter weight parameters or coefficients provided by the time-domain weighting signal (W) 306 is generated by diversity weighting circuitry 320. For the embodiment depicted, the diversity weighting circuitry 320 includes FFT block 204, FFT block 206, weight processor 302, and IFFT block 304. In particular, the first channelized I/Q signal 203 is provided to FFT block 204, which performs an N-point (N-PT) FFT operation on the first channelized I/Q signal 203. The output from FFT block 204 is provided to the weight processor 302. Similarly, the second channelized signal 205 is provided to FFT block 206, which performs an N-point (N-PT) FFT operation on the second channelized signal 205. The output from FFT block 205 is also provided to the weight processor 302. It is noted that the FFT output signals from blocks 204 and 206 are frequency-domain signals that include multiple frequency components in N different frequency bins determined by the N-point FFT operations.

The weight processor 302 analyzes the FFT output signals from blocks 204 and 206 to determine signal parameters associated with the received signals from the two different antennas 138 and 140. For example, as indicated above, the signal parameters can include signal-to-noise ratio information, signal strength information, and/or phase information. The weight processor 302 then determines signal path weights based upon the analysis of the signal parameters and produces one path weight signal 303. This path weight signal 303 is a frequency-domain signal. The path weight signal 303 is provided to IFFT block 304, which converts the path weight signal 303 from a frequency-domain signal to a time-domain weighting signal (W) 306.

As with the IFFT blocks 210 and 212 in FIG. 2, it is noted that the IFFT block 304 in FIG. 3 can be configured to provide a reduced number of filter weighting parameters or coefficients (Y) as compared to the number of frequency points (N) used by the FFT blocks 204 and 206, such that Y<N. Preferably, this number of weighting parameters or coefficients (Y) is much less than the number of frequency points (N). For example, the number of points (N) can be on the order of 2048 points, and the number of weighting parameters or coefficients can be on the order of 38 filter weighting parameters or coefficients (e.g., 38 filter taps for an FIR filter). It is also noted that the channelizing circuitry 156 and 166 can provide digital channelized I/Q signals at a rate of 744 kilo-samples per second, if desired. It is further noted that different numbers of FFT points and/or IFFT output parameters, as well as different sample rates, could also be implemented, as desired, while still utilizing the time-domain diversity combining techniques described herein.

Figure 8:
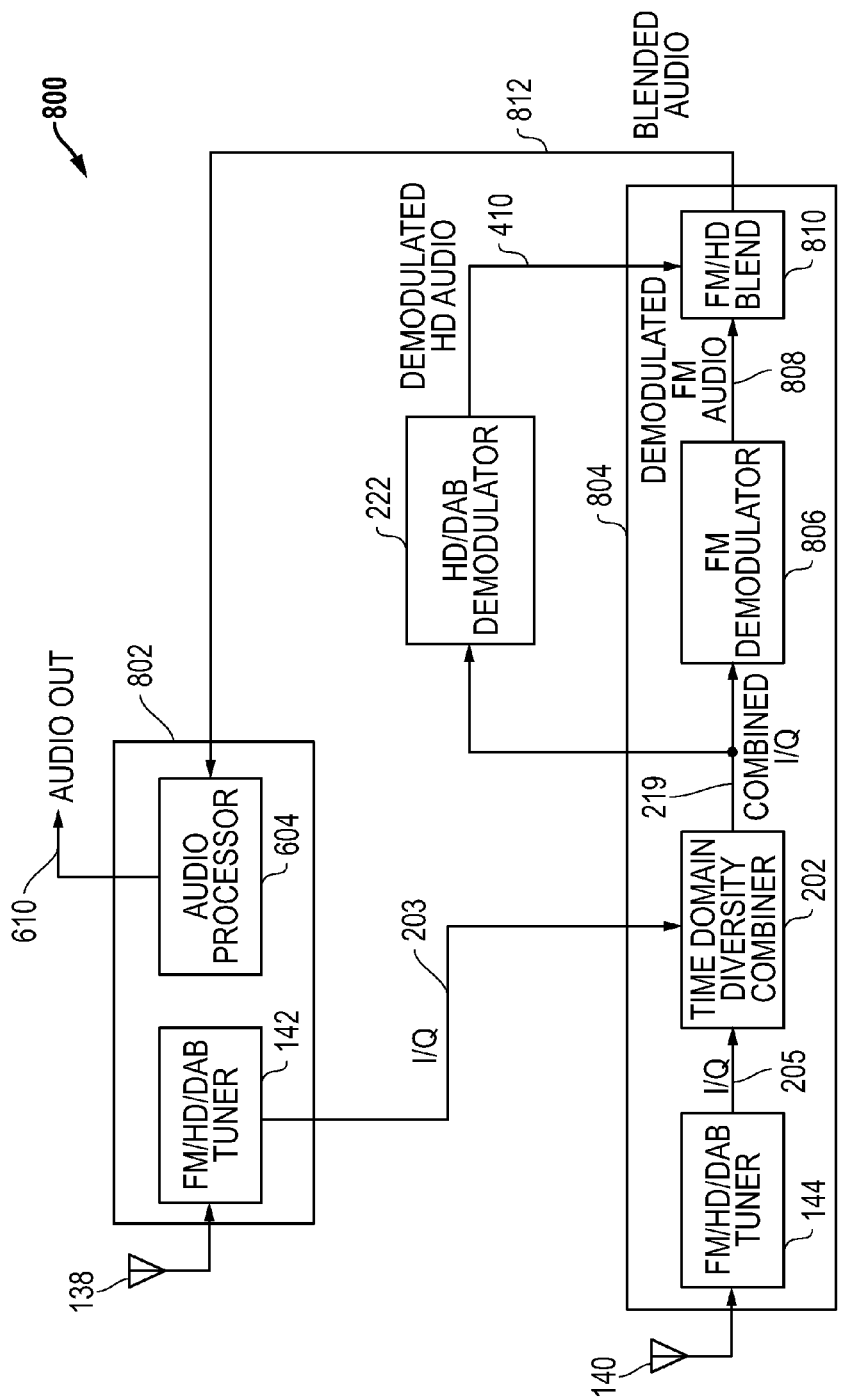
FIG. 8 is a block diagram of an embodiment for a receiver system that integrates an FM demodulator with a tuner/diversity integrated circuit.
Figure 9:
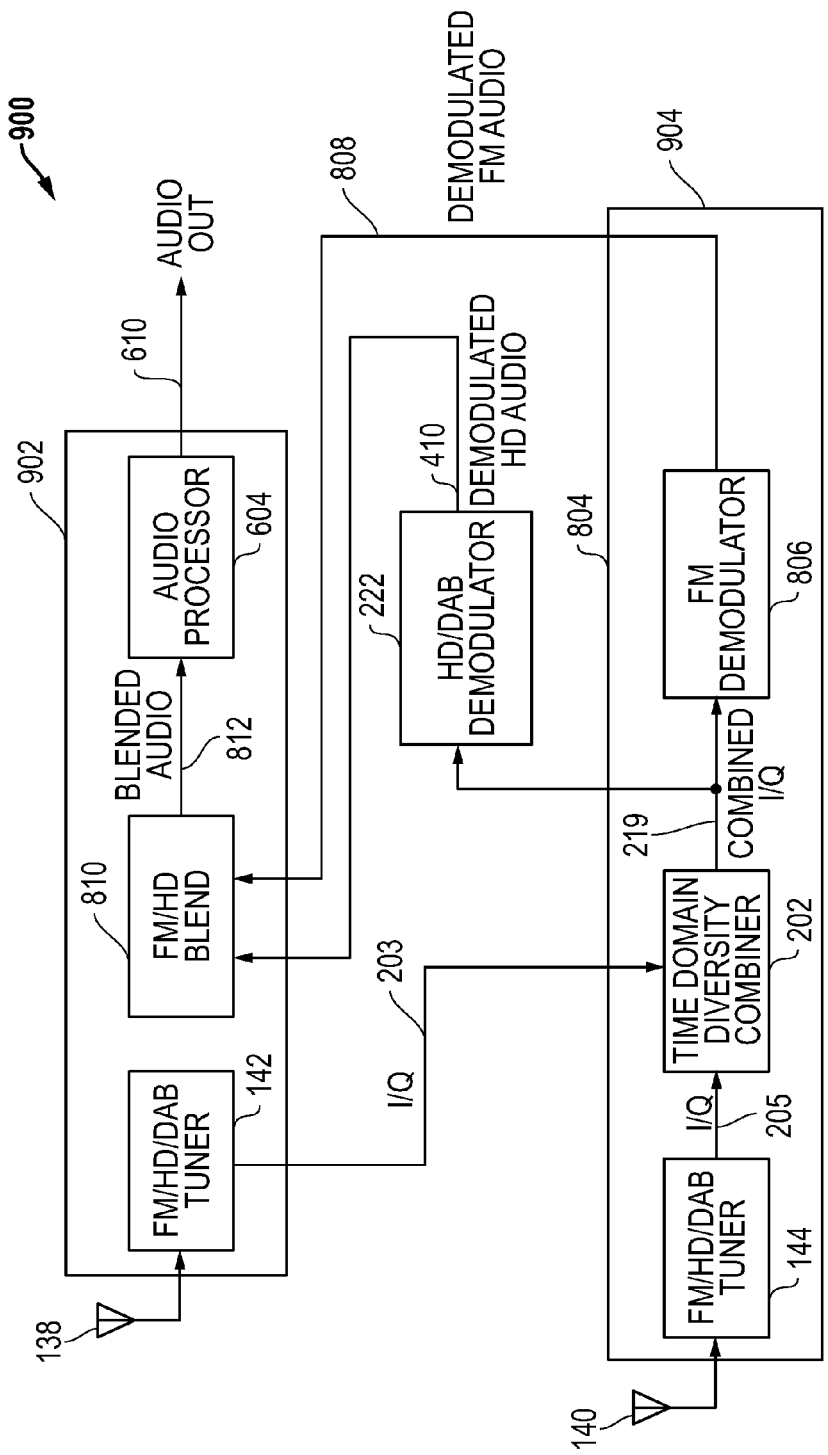
FIG. 9 is a block diagram of an embodiment for a receiver system that integrates blend circuitry within a tuner/audio integrated circuit.
Figure 10:
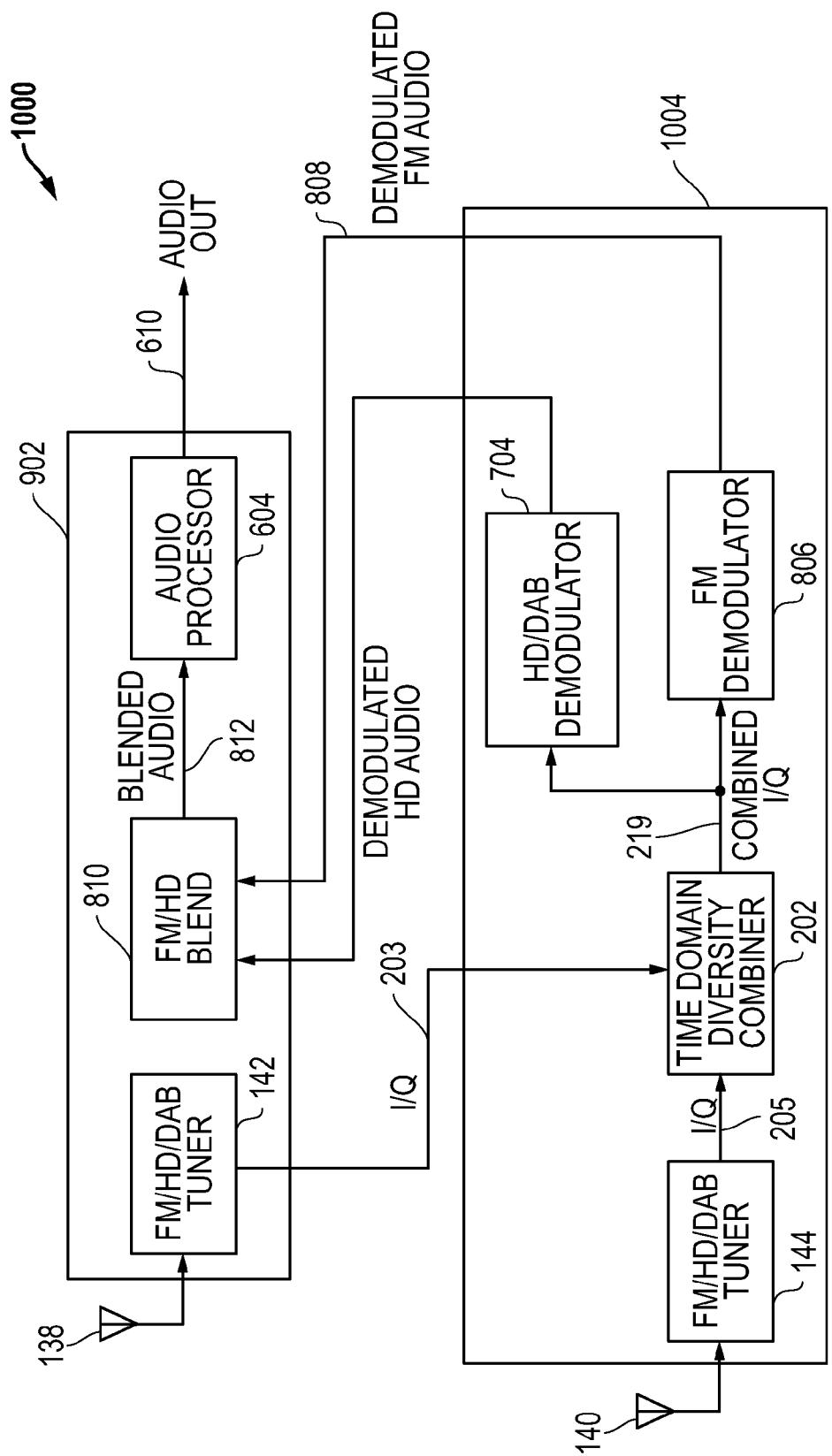
FIG. 10 is a block diagram of an embodiment for a receiver system that integrates blend circuitry within a tuner/audio integrated circuit and integrates an FM demodulator and an HD/DAB demodulator within a tuner/diversity integrated circuit.

The efficiency and reduction in complexity provided by the time-domain diversity combining techniques described herein allow for advantageous receiver system solutions. For example, the time-domain diversity combining circuitry can be integrated into its own integrated circuit and/or can be combined with other circuitry within an integrated circuit that provides multiple functions within the receiver system. FIGS. 4-7 provide example integrated circuit embodiments for digital broadcast receiver systems that are configured to receive HD-Radio and/or DAB broadcasts. FIGS. 8-10 provide example integrated circuit embodiments for digital broadcast receiver systems that are configured to receive FM broadcasts in addition to HD-Radio and/or DAB broadcasts. It is also noted that one or more of the functional blocks described herein can be implemented, in whole or in part, using one or more digital signal processing (DSP) circuit blocks that are configured to perform desired functions, for example, using firmware loaded on the integrated circuits and utilized by the DSP circuit blocks to implement the desired functionality. It is also noted that variations to the integrated circuit examples provided in FIGS. 4-10 could be implemented, if desired.

Figure 4:
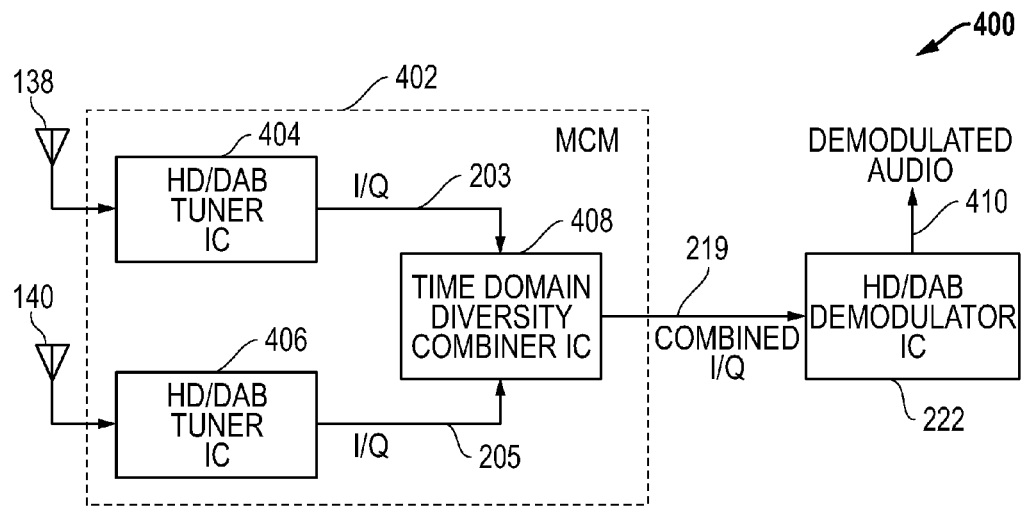
FIG. 4 is a block diagram of an embodiment for a receiver system that utilizes two tuner integrated circuits and a separate diversity combiner integrated circuit.

FIG. 4 is a block diagram of an embodiment 400 for a receiver system that utilizes a separate integrated circuit for the time-domain diversity combiner circuitry. For the embodiment 400 depicted, a first HD/DAB tuner integrated circuit (IC) 404 receives RF signals from the first antenna 138 and outputs a first channelized I/Q signal 203 to a separate time-domain diversity combiner integrated circuit (IC) 408. A second HD/DAB tuner integrated circuit (IC) 406 receives RF signals from the second antenna 140 and outputs a second channelized I/Q signal 205 to the separate time-domain diversity combiner integrated circuit (IC) 408. As described above, the time-domain diversity combining circuitry within the time-domain diversity combiner IC 408 analyzes, weights, and combines the two I/Q input signals 203/205 to generate a combined receive I/Q signal 219 that is provided to demodulator 222. In the embodiment 400 depicted, the demodulator 222 is configured to demodulate the HD-Radio and/or DAB digital broadcast signals received by the tuner ICs 404 and 406 to generate a demodulated audio output signal 410 that can be further processed as desired. It is noted that the time-domain diversity combiner IC 408 can be combined in a single multi-chip module (MCM) 402 with the first tuner IC 404 or the second tuner IC 406, if desired. It is further noted that the time-domain diversity combiner IC 408 can be combined in a single multi-chip module (MCM) 402 with both of the two tuner ICs 404 and 406, if desired. Other variations could also be implemented as desired.

Figure 5:
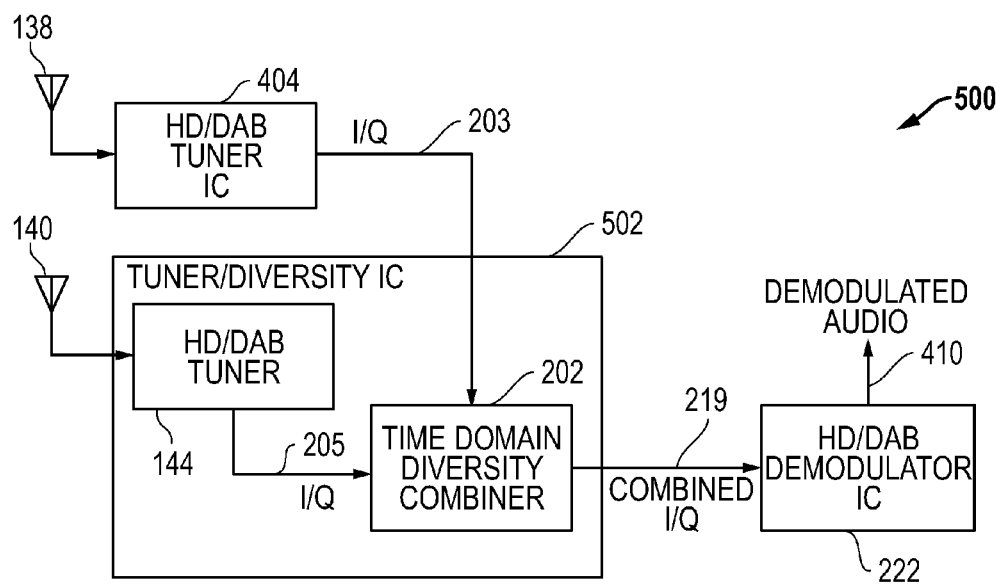
FIG. 5 is a block diagram of an embodiment for a receiver system that utilizes a combined tuner and diversity integrated circuit.

FIG. 5 is a block diagram of an embodiment 500 for a receiver system that integrates the time-domain diversity combiner circuitry 202 into a combined receiver and diversity integrated circuit (IC) 502. For the embodiment 500 depicted, a first HD/DAB tuner integrated circuit (IC) 404 receives RF signals from the first antenna 138 and outputs a first channelized I/Q signal 203 to the time-domain diversity combining circuitry 202 within the tuner/diversity IC 502. Second HD/DAB tuner circuitry 144 receives RF signals from the second antenna 140 and outputs a second channelized I/Q signal 205 to the time-domain diversity combining circuitry 202. As indicated above, second HD/DAB tuner circuitry 144 and the time-domain diversity combining circuitry 202 are integrated within the same integrated circuit, which is the tuner/diversity IC 502. Further, as described above, the time-domain diversity combining circuitry 202 analyzes, weights, and combines the two channelized I/Q input signals 203/205 to generate a combined receive I/Q signal 219 that is provided to demodulator 222. In the embodiment 500 depicted, the demodulator 222 is again configured to demodulate HD-Radio and/or DAB digital broadcast signals received by the tuner IC 404 and the receive circuitry 144 to generate a demodulated audio output signal 410 that can be further processed as desired. Other variations could also be implemented as desired.

Figure 6:
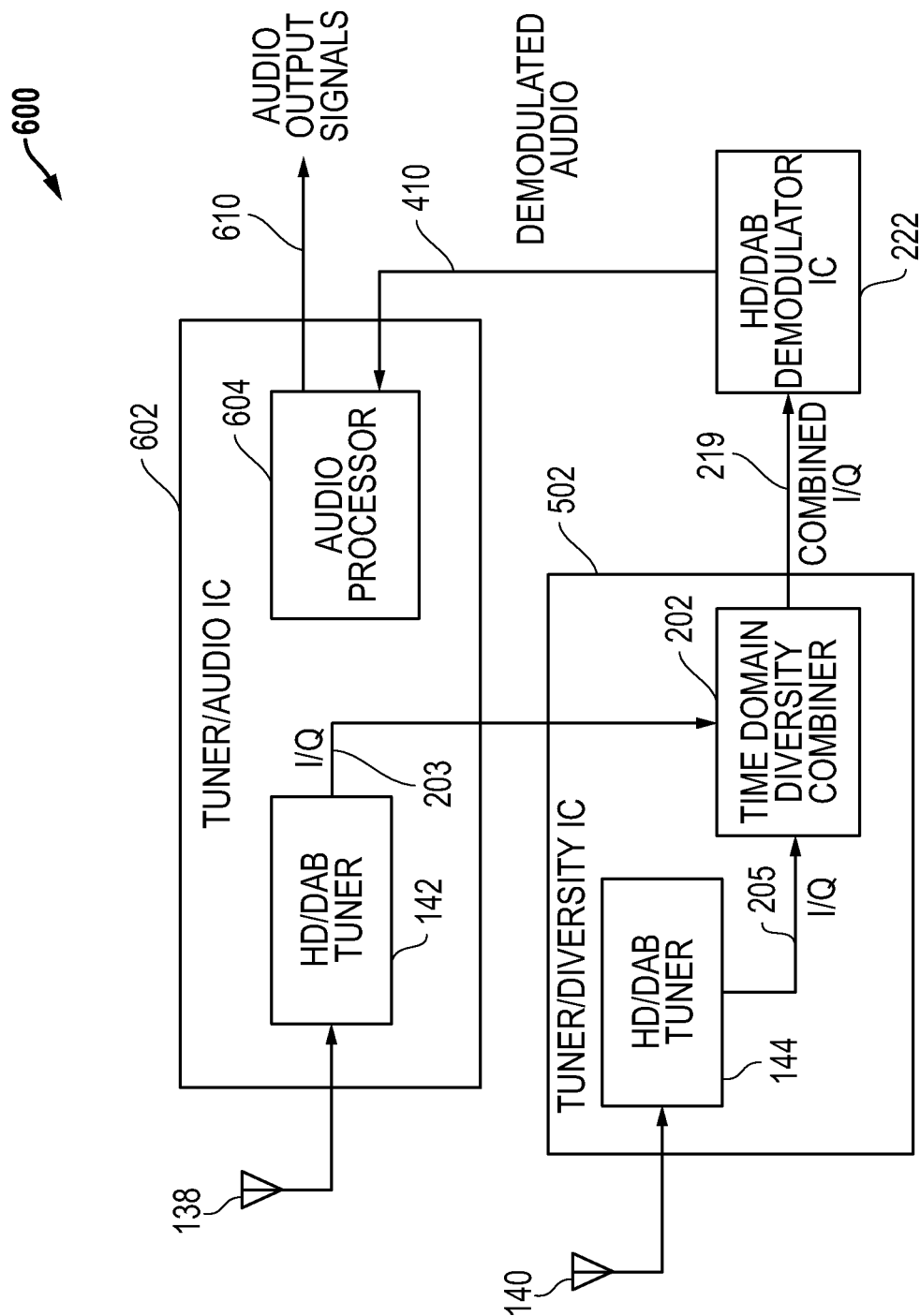
FIG. 6 is a block diagram of an embodiment for a receiver system utilizes a combined tuner and audio processing integrated circuit.

FIG. 6 is a block diagram of an embodiment 600 for a receiver system that integrates an audio processor 604, such as a HI-FI audio processor, with integrated tuner circuitry 142 to form a combined tuner and audio processing integrated circuit (IC) 602. In addition, as with FIG. 5, the time-domain diversity combiner circuitry 202 is also integrated into a combined tuner and diversity integrated circuit (IC) 502. For the embodiment 600 depicted, first HD/DAB tuner circuitry 142 within the tuner/audio IC 602 receives RF signals from the first antenna 138 and outputs a first channelized I/Q signal 203 to the time-domain diversity combining circuitry 202 within the tuner/diversity IC 502. Second HD/DAB tuner circuitry 144 receives RF signals from the second antenna 140 and outputs a second channelized I/Q signal 205 to the time-domain diversity combining circuitry 202. As indicated above, the first tuner HD/DAB circuitry 142 and the audio processor circuitry 604 are integrated within the same integrated circuit, which is tuner/audio IC 602. Also, the second HD/DAB tuner circuitry 144 and the time-domain diversity combining circuitry 202 are integrated within the same integrated circuit, which is the tuner/diversity IC 502. Further, as described above, the time-domain diversity combining circuitry 202 analyzes, weights, and combines the two channelized I/Q input signals 203/205 to generate a combined receive I/Q signal 219 that is provided to demodulator 222. For the embodiment 600 depicted, the demodulator 222 is again configured to demodulate the HD-Radio and/or DAB digital broadcast signals received by tuner circuitry 142 and 144 to generate a demodulated audio output signal 410 that can be further processed as desired. Further, the audio processor circuitry 604 within tuner/audio IC 602 receives the demodulated audio output signal 410 and further processes these signals to generate audio output signals 610. For example, the audio processor circuitry 604 can be configured to perform HI-FI audio processing to the demodulated output signal 410 to generate the audio output signals 610, which can be utilized by other circuitry and/or systems as desired. Other variations could also be implemented as desired.

Figure 7:
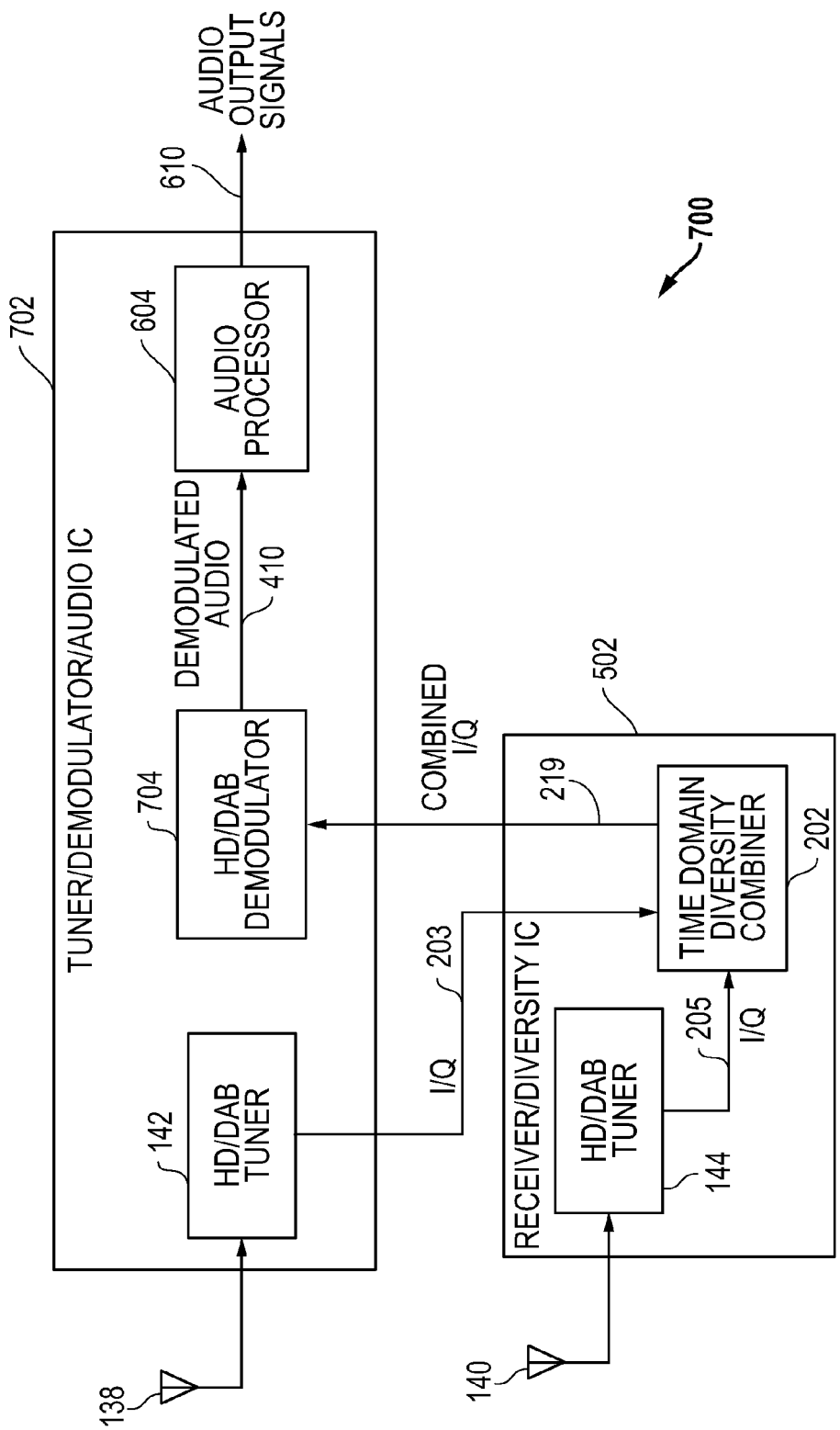
FIG. 7 is a block diagram of an embodiment for a receiver system that utilizes a combined tuner, demodulator, and audio processing integrated circuit.

FIG. 7 is a block diagram of an embodiment 700 for a receiver system that integrates an audio processor 604, such as a HI-FI audio processor, and a demodulator 704 with integrated tuner circuitry 142 to form a combined tuner, demodulator, and audio processing integrated circuit (IC) 702. In addition, as with FIGS. 5 and 6, the time-domain diversity combiner circuitry 202 is also integrated into a combined tuner and diversity integrated circuit (IC) 502. For the embodiment 700 depicted, first HD/DAB tuner circuitry 142 within the tuner/audio IC 602 receives RF signals from the first antenna 138 and outputs a first channelized I/Q signal 203 to the time-domain diversity combining circuitry 202 within the tuner/diversity IC 502. Second HD/DAB tuner circuitry 144 receives RF signals from the second antenna 140 and outputs a second channelized I/Q signal 205 to the time-domain diversity combining circuitry 202. As indicated above, the first tuner HD/DAB circuitry 142, the demodulator 704, and the audio processor circuitry 604 are integrated within the same integrated circuit, which is tuner/demodulator/audio IC 702. Also, the second HD/DAB tuner circuitry 144 and the time-domain diversity combining circuitry 202 are integrated within the same integrated circuit, which is the tuner/diversity IC 502. Further, as described above, the time-domain diversity combining circuitry 202 analyzes, weights, and combines the two channelized I/Q input signals 203/205 to generate a combined receive I/Q signal 219 that is provided to demodulator circuitry 704 within the tuner/demodulator/audio IC 704. For the embodiment 700 depicted, the demodulator 704 is again configured to demodulate the HD-Radio and/or DAB digital broadcast signals received by tuner circuitry 142 and 144 to generate a demodulated audio output signal 410 that can be further processed as desired. Further, the audio processor circuitry 604 within tuner/demodulator/audio IC 602 receives the demodulated audio output signal 410 and further processes these signals to generate audio output signals 610. For example, the audio processor circuitry 604 can be configured to perform HI-FI audio processing to the demodulated output signal 410 to generate the audio output signals 610, which can be utilized by other circuitry and/or systems as desired. Other variations could also be implemented as desired.

Now looking to FIGS. 8-10, embodiment that include reception and demodulation of FM audio broadcasts are discussed. In particular, these embodiments are directed to receiver systems that are configured to receive FM audio broadcasts, as well as HD/DAB audio broadcasts, and are also configured to blend between received FM signals and received HD/DAB signals depending upon respective signal strengths. Such blended audio techniques, for example, can improve user experience when listening to HD/DAB audio broadcasts that have signal strengths that vary significantly.

FIG. 8 is a block diagram of an embodiment 800 for a receiver system that integrates FM demodulator 806 with the tuner circuitry 144 and time-domain diversity combiner circuitry 202 to form integrated circuit (IC) 804. First FM/HD/DAB tuner circuitry 142 within a tuner/audio IC 802 receives RF signals from the first antenna 138 and outputs a first channelized I/Q signal 203 to the time-domain diversity combining circuitry 202 within the second IC 804. Second FM/HD/DAB tuner circuitry 144 receives RF signals from the second antenna 140 and outputs a second channelized I/Q signal 205 to the time-domain diversity combining circuitry 202. As indicated above, the first tuner FM/HD/DAB circuitry 142 and the audio processor circuitry 604 are integrated within the same integrated circuit, which is tuner/audio IC 802. Also, the second FM/HD/DAB tuner circuitry 144 and the time-domain diversity combining circuitry 202 are integrated within the same integrated circuit, which is the second IC 804. Further, as described above, the time-domain diversity combining circuitry 202 analyzes, weights, and combines the two channelized I/Q input signals 203/205 to generate a combined receive I/Q signal 219 that is provided to demodulator 222. For the embodiment 800 depicted, the demodulator 222 is again configured to demodulate the HD-Radio and/or DAB digital broadcast signals received by tuner circuitry 142 and 144 to generate a demodulated audio output signal 410. However, for embodiment 800, the combined receive I/Q 219 is also provided to FM demodulator 806, which provides FM demodulation and generates a demodulated FM audio signal 808. FM/HD blend circuitry 810 then receives both the demodulated HD audio signal 410 and the demodulated FM audio signal 808 and generates a blended audio signal 812. As indicated above, this blended audio signal 812 can be configured to blend a mixture of the FM audio signal 808 and the HD audio signal 410, depending upon the relative received signal strengths of the FM audio broadcasts and the HD/DAB audio broadcasts. Further, the audio processor circuitry 604 within tuner/audio IC 902 receives the blended audio signals 812 and further processes these signals to generate audio output signals 610. For example, the audio processor circuitry 604 can be configured to perform HI-FI audio processing to the blended audio signals 812 to generate the audio output signals 610, which can be utilized by other circuitry and/or systems as desired. Other variations could also be implemented as desired.

FIG. 9 is a block diagram of an embodiment 900 for a receiver system that integrates FM/HD blend circuitry 810 within a tuner/audio IC 902. As with embodiment 800 of FIG. 8, a FM/HD/DAB tuner 142 is integrated with time-domain diversity combining circuitry 202 and FM demodulator 806, as shown with respect to integrated circuit 904. However, unlike embodiment 800, FM/HD blend circuitry 810 is integrated with FM/HD/DAB tuner 152 and audio processor 604, as shown with respect to integrated circuit 902. As such, the FM/HD blend circuitry 810 receives the demodulated HD audio signal 410 from demodulator 222 and the demodulated FM audio signal 808 from integrated circuit 804 and then generates the blended audio signal 812 for the audio processor 604. Other variations could also be implemented as desired.

FIG. 10 is a block diagram of an embodiment 1000 for a receiver system that integrates an HD/DAB demodulator with a tuner/diversity IC 1004. As with embodiment 900 of FIG. 9, a FM/HD/DAB tuner 142 is integrated with time-domain diversity combining circuitry 202 and FM demodulator 806, as shown with respect to integrated circuit 1004. Also, FM/HD blend circuitry 810 is integrated with FM/HD/DAB tuner 152 and audio processor 604, as shown with respect to integrated circuit 902. However, unlike embodiment 900, HD/DAB demodulator 704 is integrated within integrated circuit 902. As such, integrated circuit 1004 provides both the demodulated HD audio signal 410 and the demodulated FM audio signal 808 to the FM/HD blend circuitry 810 within integrated circuit 902. Other variations could also be implemented as desired.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A diversity receiver system, comprising:
   first tuner circuitry configured to receive a radio frequency (RF) signal from a first antenna and to down-convert, digitize, and channelize the RF signal to generate a first time-domain channelized quadrature (I/Q) signal;
   second tuner circuitry configured to receive a radio frequency (RF) signal from a second antenna and to down-convert, digitize, and channelize the RF signal to generate a second time-domain channelized quadrature (I/Q) signal; and
   time-domain diversity combining circuitry configured to receive the first and second channelized I/Q signals, to convert the first and second channelized I/Q signals to frequency-domain signals, to analyze the frequency-domain signals to determine frequency-domain diversity weights for the first and second channelized I/O signals, to convert the frequency-domain diversity weights into at least one set of time-domain diversity weights, and to apply the time-domain diversity weights to generate a combined time-domain diversity I/Q signal based upon the first and second time-domain channelized I/Q signals;

wherein the time-domain diversity combining circuitry comprises:

first FFT (Fast Fourier Transform) circuitry coupled to receive the first time-domain channelized I/Q signal and to output a first frequency-domain signal having multiple frequency components;

second FFT circuitry coupled to receive the second time-domain channelized I/Q signal and to output a second frequency-domain signal having multiple frequency components;

weight processing circuitry configured to receive the first and second frequency-domain signals and to generate the frequency-domain diversity weights; and IFFT (Inverse Fast Fourier Transform) circuitry coupled to receive the frequency-domain diversity weights and to generate the at least one set of time-domain diversity weights.

2. The diversity receiver system of claim 1, wherein the first and second tuner circuitry are configured to receive OFDM (orthogonal frequency division multiplex) audio broadcast signals.

3. The diversity receiver system of claim 1, wherein the first tuner circuitry is integrated within a first integrated circuit and wherein the second tuner circuitry is integrated within a second integrated circuit.

4. The diversity receiver system of claim 3, wherein the time-domain diversity combining circuitry is integrated within a third integrated circuit, and wherein the third integrated circuit is combined in a multi-chip module with at least one of the first integrated circuit or the second integrated circuit.

5. The diversity receiver system of claim, 3 wherein the time-domain diversity combining circuitry is integrated within the second integrated circuit.

6. The diversity receiver system of claim 5, further comprising a demodulator configured to receive the combined time-domain diversity I/Q signal and to output a demodulated audio signal.

7. The diversity receiver system of claim 6, wherein the demodulator is configured to demodulate at least one of HD-Radio (High Definition Radio) broadcast signals or DAB (Digital Audio Broadcast) broadcast signals.

8. The diversity receiver system of claim 7, further comprising an FM (Frequency Modulated) demodulator integrated within the second integrated circuit and configured to receive the combined time-domain diversity I/Q signal, to demodulate FM broadcast signals, and to generate an FM demodulated audio signal.

9. The diversity receiver system of claim 8, further comprising blend circuitry configured to receive the FM demodulated audio signal and the demodulated audio signal and to generate a blended audio signal.

10. The diversity receiver system of claim 6, further comprising audio processing circuitry configured to receive the demodulated audio signal and to generate audio output signals, the audio processing circuitry being integrated within the first integrated circuit.

11. The diversity receiver system of claim 10, wherein the audio processing circuitry is configured to provide HI-FI audio processing.

12. The diversity receiver system of claim 10, wherein the demodulator is integrated within one of the first integrated circuit or the second integrated circuit.

13. The diversity receiver system of claim 12, wherein the demodulator is configured to demodulate at least one of HD-Radio (High Definition Radio) broadcast signals or DAB (Digital Audio Broadcast) broadcast signals.

14. The diversity receiver system of claim 1, wherein the weight processing circuitry is configured to generate a first set and a second set of frequency-domain diversity weights, and wherein the IFFT circuitry comprises first IFFT circuitry configured to receive the first set of frequency-domain diversity weights and to generate a first set of time-domain diversity weights and second IFFT circuitry configured to receive the second set of frequency-domain diversity weights and to generate a second set of time-domain diversity weights.

15. The diversity receiver system of claim 14, wherein the time-domain diversity combining circuitry further comprises:

a first filter configured to apply a first filter response to the first channelized I/Q signal based upon the first set of time-domain diversity weights;

a second filter configured to apply a second filter response to the second channelized I/Q signal based upon the second set of time-domain diversity weights; and combiner circuitry configured to combined the filtered first and second channelized I/Q signals from the first and second filters to generate the combined time-domain diversity I/Q signal.

16. The diversity receiver system of claim 14, wherein the first and second IFFT circuitry are each configured to generate a number (Y) of time-domain diversity weights that is less than a number (N) of points used by the first and second FFT circuitry to generate the frequency-domain signals having multiple frequency components.

17. The diversity receiver system of claim 1, wherein the weight processing circuitry is configured to generate a set of frequency-domain diversity weights, and wherein the IFFT circuitry is configured to receive the set of frequency-domain diversity weights and to generate a set of time-domain diversity weights.

18. The diversity receiver system of claim 17, wherein the time-domain diversity combining circuitry further comprises:

a filter configured to apply a filter response to the second channelized I/Q signal based upon the set of time-domain diversity weights;

delay circuitry coupled to the first channelized I/Q signal; and combiner circuitry configured to combined the filtered second channelized I/Q signal from the filter with the first channelized I/Q signal to generate the combined time-domain diversity I/Q signal.

19. The diversity receiver system of claim 17, wherein the IFFT circuitry is configured to generate a number (Y) of time-domain diversity weights that is less than a number (N) of points used by the first and second FFT circuitry to generate the frequency-domain signals having multiple frequency components.

20. A method for operating a diversity receiver system, comprising:

generating a first time-domain channelized quadrature (I/Q) signal from a radio frequency (RF) signal received from a first antenna;

generating a second time-domain channelized quadrature (I/Q) signal from a radio frequency (RF) signal received from a first antenna;

converting the first and second time-domain channelized I/Q signals to frequency-domain signals;
determining frequency-domain diversity weights for the first and second I/Q signals;
converting the frequency-domain diversity weights into at least one set of time-domain diversity weights; and
applying the time-domain diversity weights to generate a combined time-domain diversity I/Q signal based upon the first and second time-domain channelized I/O signals; and
further comprising utilizing FFT (Fast Fourier Transform) circuitry to convert the first and second time-domain channelized I/Q signals to frequency-domain signals, and utilizing IFFT (Inverse Fast Fourier Transform) circuitry to convert the frequency-domain diversity weights to the at least one set of time-domain diversity weights.

21. The method of claim 20, wherein the received RF signals comprise OFDM (orthogonal frequency division multiplex) audio broadcast signals.

22. The method of claim 20, wherein a number (Y) of time-domain diversity weights output by the IFFT circuitry is less than a number (N) of points used by the FFT circuitry to generate the frequency-domain signals.

23. The method of claim 20, further comprising generating a first set and a second set of frequency-domain diversity weights with the FFT circuitry, generating a first set and a second set of time-domain diversity weights with the IFFT circuitry, filtering the first channelized I/Q signal by applying the first set of time-domain diversity weights to a first filter, filtering the second channelized I/Q signal by applying the second set of time-domain diversity weights to a second filter, and combining output signals from the first and second filters to generate the combined time-domain diversity I/Q signal.

24. The method of claim 20, further comprising generating a set of frequency-domain diversity weights with the FFT circuitry, generating a set of time-domain diversity weights with the IFFT circuitry, filtering the second channelized I/Q signal by applying the set of time-domain diversity weights to a filter, delaying the first channelized I/Q signal to generate a delayed version of the first channelized I/Q signal, and combining an output signal from the filter and the delayed version of the first channelized I/Q signal to generate the combined time-domain diversity I/Q signal.

\* \* \* \* \*